United States Patent [19]

Pinault

[11] Patent Number: 5,699,984
[45] Date of Patent: Dec. 23, 1997

[54] ENERGY-ABSORBING LINK MEMBER AND AN AIRCRAFT SEAT FITTED WITH SUCH A MEMBER

[75] Inventor: Fabrice Pinault, Issoudun, France

[73] Assignee: Societe Industrielle et Commerciale de Materiel Aeronautique, Issoudun, France

[21] Appl. No.: 655,461

[22] Filed: May 30, 1996

[30] Foreign Application Priority Data

May 31, 1995 [FR] France ................................ 95 06485

[51] Int. Cl.$^6$ ................................................ B64D 25/04
[52] U.S. Cl. .................. 244/122 R; 188/371; 297/216.1
[58] Field of Search ........................ 244/122 R; 188/371, 188/374, 372; 297/216.14, 378.11, 216.1, 216.13, 216.2, 378.1

[56] References Cited

U.S. PATENT DOCUMENTS

| | | | |
|---|---|---|---|
| 2,971,566 | 2/1961 | Negroni | 244/122 R |
| 3,538,785 | 11/1970 | Grancon | 188/371 |
| 3,985,388 | 10/1976 | Hogan | 244/122 R |
| 4,150,805 | 4/1979 | Mazelsky | 244/122 R |
| 5,271,314 | 12/1993 | Derrien | 188/371 |
| 5,273,240 | 12/1993 | Sharon | 244/122 R |
| 5,454,622 | 10/1995 | Demopoulos | 188/374 |

*Primary Examiner*—Galen Barefoot
*Attorney, Agent, or Firm*—Young & Thompson

[57] ABSTRACT

An energy-absorbing bolt specially designed for an aircraft seat. It comprises an outer sleeve terminated at a first end by fastening means for fastening to a first structural element; an inner sleeve terminated at an opposite, second end by a rod suitable for being rigidly associated with a second structural element; the two sleeves being fitted one in the other in such a manner as to enable one to slide axially relative to the other in the event of the bolt being subjected to energy exceeding a certain threshold; a first pin constituting a fuse relative to the trigger threshold being mounted transversely in holes and being held in position by a locking member; a second pin also being mounted transversely so as to project at at least one of its ends from the inner sleeve in a complementary housing, and having, during axial sliding in the moving-apart direction, a first function of deforming the outer sleeve to absorb energy, and a second function of providing an end-of-stroke stop by co-operating with an inside projection of the outer sleeve.

12 Claims, 1 Drawing Sheet

ENERGY-ABSORBING LINK MEMBER AND AN AIRCRAFT SEAT FITTED WITH SUCH A MEMBER

The invention relates to an energy-absorbing link member. It is also relates to an aircraft seat fitted with such a member.

BACKGROUND OF THE INVENTION

It is known that two structural elements can be rigidly secured to each other by interposing a link member between the two elements, which link member can be referred to as a "bolt" in the technical field of aircraft seats. This link member may be triggered when the energy to which it is subjected exceeds a certain threshold.

Such members are nevertheless not designed to absorb the energy to which they are subjected.

OBJECT AND SUMMARY OF THE INVENTION

The invention therefore seeks to provide a link member of the above-specified type that absorbs energy.

Such an energy-absorbing link member comprises an outer sleeve terminated by at a first end by fastening means suitable for being rigidly associated with a first structural element of the seat; an inner sleeve terminated at an opposite, second end by a rod suitable for being rigidly associated with a second structural element of the seat; the two sleeves being fitted one in the other so that one is capable of sliding axially relative to the other in the event of the member being subjected to a force exceeding a certain threshold; the two sleeves being provided with facing holes on a transverse axis; a first pin constituting a fuse relative to the trigger threshold being mounted transversely through the holes and being held in position by a locking member such as a spring clip; a second pin being mounted transversely relative to the two sleeves in such a manner as to pass through them, to be carried by and to have at least one end projecting from the inner sleeve which is provided with at least one transverse-axis hole while being placed within the outer sleeve which includes a complementary housing in its inside face, the second pin having the primary function, while the two sleeves are sliding relatively axially apart due to the trigger threshold being exceeded, of deforming the outer sleeve whose inside dimension is smaller than the corresponding dimension of the second pin so as to absorb energy, and having a second function of constituting an end-of-stroke stop by co-operating with an internal projection formed on the inside face of the outer sleeve.

According to other characteristics, the outer sleeve includes a hollow housing in its inside face at the location where the projecting free end portion of the second pin is to be found in the inactive position, the inside face extending axially from the housing towards the second end with an inside dimension that is slightly smaller than the corresponding overall dimension of the second pin and being provided, away from the housing and towards the second end, with an internal projection extending substantially transversely and having an inside dimension that is considerably smaller than the corresponding overall dimension of the second pin.

The inside face of the outer sleeve includes two end segments of smaller inside dimension, adjusted to co-operate with the outside face of the inner sleeve, and an intermediate segment away from said outside face and terminated towards the first end by the housing and towards the second end by the projection.

The outer sleeve may have reduced thickness in its intermediate segment.

Preferably, the outer sleeve has a configuration that is substantially symmetrical about the axis. The housing of the inner sleeve and/or the end-of-stroke locking projection extend angularly around the axis of the sleeve.

The outer sleeve also includes a through hole on a transverse axis provided in register with the housing and communicating therewith to enable the second pin to be installed.

The common axis of the holes of the outer and inner sleeves for mounting the first pin, and of the first pin itself, together with the axis of the hole for mounting the second pin, are all substantially parallel with one another, and perpendicular to the axis of the second pin.

The axis common to the holes of the outer and inner sleeves, for mounting the first pin, and of the first pin itself, and also the axis of the hole for mounting the second pin are substantially perpendicular to the axis of the second pin.

The inner sleeve includes two holes for supporting the second pin, which pin projects diametrically at both of its ends from the inner sleeve.

In another aspect, the invention provides an aircraft seat including at least one energy-absorbing link member (or bolt) as specified above.

BRIEF DESCRIPTION OF THE DRAWING

The invention will be well understood from the following description of a non-limiting embodiment given with reference to the accompanying drawing, in which.

MORE DETAILED DESCRIPTION

Figure 1:
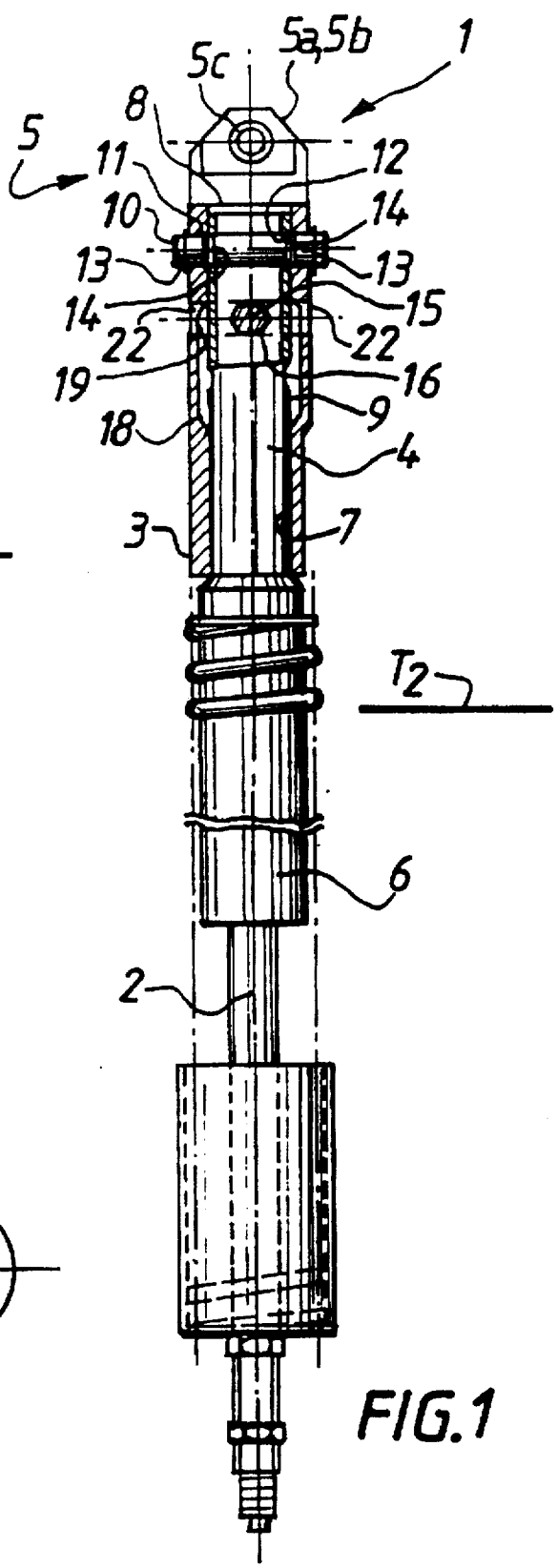
FIG. 1 is a diagrammatic section view in an axial plane showing the link member of the invention.

Reference is now made more particularly to FIG. 1 which shows an energy-absorbing link member (known as a bolt) 1 specifically designed for an aircraft seat and more specifically for the back thereof.

Such a part 1 is therefore designed to be interposed between two structural elements of the seat, i.e. a first structural element and a second structural element, which are not shown.

The part 1 has a general axis 2.

It comprises an outer sleeve 3 and an inner sleeve 4.

The outer sleeve 3 is terminated at a first end (to the top of FIGS. 1 and 2) by fastening means 5.

The fastening means 5 are organized to enable the first structural element to be rigidly associated with the part 1.

Figure 2:
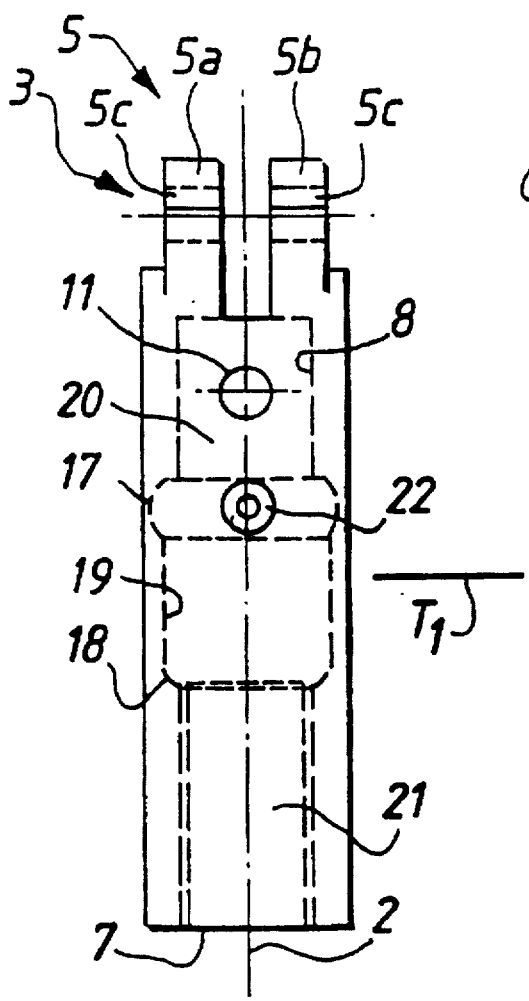
FIG. 2 is a diagrammatic section view in an axial plane perpendicular to the axis plane of the FIG. 1 section and showing the outer sleeve.

For example, the fastening means 5 may be in the form of two lugs 5a and 5b provided with a hole 5c extending in a first transverse direction $T_1$ (FIG. 2).

This first transverse direction $T_1$ extends perpendicularly to the plane of FIG. 1. A second transverse direction $T_2$ (FIG. 1) lies in the plane of FIG. 1 and, like the first transverse direction $T_1$, it extends perpendicularly to the axis 2.

The inner sleeve 4 is terminated at the second end, opposite to the first end (at the bottom of FIGS. 1 and 2), by a rod 6 capable of being rigidly associated with a second structural element.

The outer sleeve 3 is closed towards the first end by the fastening means 5 and it is open towards the second end by an opening 7 allowing the inner sleeve 4 and the rod 6 to pass therethrough.

Both the outer sleeve 3 and the inner sleeve 4 are hollow.

Both sleeves 3 and 4 are made of a rigid material, such as aluminum.

The two sleeves 3 and 4 are fitted one in the other so as to be capable of sliding one relative to the other along the axis 2 in the event that the part 1 is subjected to a force exceeding a certain threshold.

To facilitate explanation, reference 8 is given to the inside face of the outer sleeve 3 while reference 9 is given to the outside face of the inner sleeve 4.

The two sleeves 3 and 4 are fitted together, as mentioned above, in such a manner that the inside face 8 and the outside face 9 are in contact with each other over at least a fraction of their length and are therefore of the same radial size, ignoring clearance.

This contact between the two faces 8 and 9 acts in particular towards the fastening means 5 and towards the rod 6.

The part 1 is organized for axial sliding to take place from an inactive position shown in FIG. 1 to a final end-of-stroke end position (not shown).

In the inactive position, the two sleeves 3 and 4 are associated over practically their entire axial length.

In the final end-of-stroke end position, the segments of the inside face 8 and of the outside face 9 that are in contact are more limited, with the two sleeves 3 and 4 being moved axially further apart than they are in the inactive position.

In the vicinity of the fastening means 5, there is a first pin 10 mounted transversely parallel to the second transverse direction and held in holes 11 and 12 provided in the outer sleeve 3 and the inner sleeve 4, respectively.

These holes 11 and 12 have a transverse axis in the same direction as the second transverse direction $T_2$.

The first pin 10 preferably projects from both ends of the two pairs of diametrically opposite holes 11 and 12.

The first pin 10 is fitted to the hole 11, 12 in such a manner as to be held therein while being locked in the second transverse direction by locking members such as two spring clips 13.

The first pin 10 constitutes a fuse relative to the preset trigger threshold.

To this end, at the interface between the faces 8 and 9, it may include at least one calibrated groove 14, and in particular two as shown herein.

It will be understood that when the force to which the part 1 is subjected reaches or exceeds the preset threshold, the first pin 10 breaks in the calibrated grooves 14, thereby releasing the two sleeves 3 and 4 so as to enable them to slide axially one relative to the other.

The part 1 also includes a second pin 15.

This second pin 15 is placed in the vicinity of the first pin 10 towards the second end of the part 1. In the embodiment under consideration, its axis is parallel to the first transverse direction $T_1$.

The two pins 10 and 15 thus extend along mutually orthogonal directions.

The second pin 15 is mounted transversely relative to the two sleeves 3 and 4 so as to pass through them and be carried by the inner sleeve 4 while projecting therefrom at at least one end, and preferably at both ends.

For this purpose, the inner sleeve is provided with at least hole 16 having a transverse axis extending parallel to the first transverse direction $T_1$.

The inner sleeve 4 preferably includes two holes such as 16 which are diametrically opposite, and the second pin 15 preferably projects diametrically at both ends from the inner sleeve 4.

The description below refers to the above embodiment corresponding to the drawing.

The second pin 15 is placed in and inserted through the outer sleeve 3.

To do this, the inside face 8 is provided with a housing 17 that is complementary in shape to the corresponding shape of the second pin 15.

Figure 3:
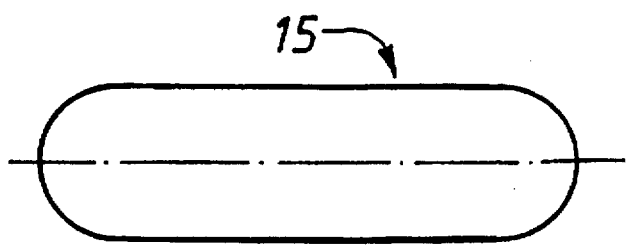
FIG. 3 is an elevation view on a larger scale of the second pin of the bolt.

In FIGS. 2 and 3, it can be seen that in this embodiment of the part 1, the housing 17 is substantially annular.

At each free end of its cylindrical central portion, the pin 15 has a convex rounded endpiece, that is substantially hemispherical in the present example.

When the part 1 is in its inactive position, the second pin 15 is in an inactive state. If the sleeves 3 and 4 are caused to slide one relative to the other, then the second pin 15 is placed in an active state.

The free end portion of the second pin 15 is in the housing 17 when in the inactive state as shown in FIG. 1, i.e. when the first pin 10 is still in place.

In contrast, the free end portion of the second pin 15 is moved out from the housing 17, as described below, in the active state of the energy-absorbing part 1, once the first pin 10 has been broken because the part 1 has been subjected to a force exceeding the preset threshold.

As well as the housing 17, the inside face 8 of the outer sleeve 3 includes an inside projection 18 that is axially offset from the housing 17, towards the second end.

The housing 17 is hollow going away from the axis 2 while the projection 18 extends towards the axis 2.

The inside projection 18 therefore extends substantially transversely, having an inside dimension that is considerably smaller than the corresponding overall dimension of the second pin 15.

As for the housing 17, the projection 18 preferably extends in annular manner around the axis 2.

The inside face 8 of the outer sleeve 3 therefore includes an intermediate length 19 terminated towards the first end by the housing 17 and towards the second end by the projection 18.

In the intermediate segment 19, the inside face 8 is radially and transversely offset from the outside face 9 facing the inner sleeve 4.

On either side of the intermediate segment 19 there are two respective end segments 20 extending towards the first end, and the fastening means 5, and 21 extending towards the second end and the rod 6.

The two end segments 20 and 21 fit with the inner sleeve 4.

Consequently, the radial transverse inside dimension of the inside face 8 is smallest in the end segments 20 and 21.

This transverse radial dimension is greater in the intermediate segment 19 and it is greatest in the housing 17.

In the intermediate segment 19, the transverse radial dimension of the inside face 8 is slightly smaller than the corresponding overall dimension of the second pin 15.

Where appropriate, the outer sleeve 3 is thinner in its intermediate segment 19.

Also, the outer sleeve 3 is preferably substantially symmetrical about the axis 2.

To enable the second pin 15 to be installed, the outer sleeve 3 also includes a through hole 22 having a transverse axis extending parallel to the second transverse direction $T_2$ and formed level with the housing 17 and in communication therewith.

With the above structure, it is possible to install the second pin 15 by causing it to penetrate through the hole 22 after it has been brought into register with the holes 16 in the inner sleeve 4.

Thereafter, the two sleeves 3 and 4 can be pivoted one relative to the other about the axis 2 so as to bring the second pin 15 so that its axis extends along the first transverse direction $T_1$, i.e. perpendicularly to the second transverse direction $T_2$ along which it was inserted.

The holes 11 and 12 can then be brought into coincidence and the first pin 10 can be installed.

In the inactive state of the second pin 15, the part 1 takes up the configuration shown in FIG. 1.

When the part is subjected to a force that exceeds a certain preset threshold, the first pin 10 breaks. The two sleeves 3 and 4 can then slide one relative to the other along the axis 2 in the disengagement direction.

However, during such sliding, the second pin 15 deforms the smaller sized intermediate segment 19 by friction and by forcing the inside face 8 outwards.

The second pin 15 therefore performs a first energy-absorption function by deforming the outer sleeve 3.

This sliding movement may be continued until the second pin 15 comes up against the internal projection 18.

Given that this is much smaller in outside dimensions than the second pin 15, it is normally no longer possible to deform the outer sleeve 3 any more and the sliding stroke is stopped. The second pin 15 therefore also provides a second function of providing an end-of-stroke stop by co-operating with the inside projection 18.

The invention also provides an aircraft seat including such a part 1.

The part 1 as described above may be combined with a device for adjusting the seat, e.g. for adjusting the inclination of the seat back relative to the seat proper.

I claim:

1. An energy-absorbing link member specially designed for an aircraft seat, more particularly for the back thereof, to be interposed between two structural elements of the seat, the member comprising an outer sleeve terminated by at a first end by fastening means suitable for being rigidly associated with a first structural element; an inner sleeve terminated at an opposite, second end by a rod suitable for being rigidly associated with a second structural element; the two sleeves being fitted one in the other so that one is capable of sliding axially relative to the other in the event of the member being subjected to a force exceeding a certain threshold; the two sleeves being provided with facing holes on a transverse axis; a first pin constituting a fuse relative to the trigger threshold being mounted transversely through the holes and being held in position by a locking member such as a spring clip; a second pin being mounted transversely relative to the two sleeves in such a manner as to pass through them, to be carried by and to have at least one end projecting from the inner sleeve which is provided with at least one transverse-axis hole while being placed within the outer sleeve which includes a complementary housing in its inside face, the second pin having the primary function, while the two sleeves are sliding axially apart due to the trigger threshold being exceeded, of deforming the outer sleeve whose inside dimension is smaller than the corresponding dimension of the second pin so as to absorb energy, and having a second function of constituting an end-of-stroke stop by co-operating with an internal projection formed on the inside face of the outer sleeve.

2. A link member according to claim 1, wherein the outer sleeve includes a hollow housing in its inside face at the location where the projecting free end portion of the second pin is to be found in the inactive position, the inside face extending axially from the housing towards the second end with an inside dimension that is slightly smaller than the corresponding overall dimension of the second pin and being provided, away from the housing and towards the second end, with an internal projection extending substantially transversely and having an inside dimension that is considerably smaller than the corresponding overall dimension of the second pin.

3. A link member according to claim 1, wherein the inside face of the outer sleeve includes two end segments of smaller inside dimension, adjusted to co-operate with the outside face of the inner sleeve, and an intermediate segment away from said outside face and terminated towards the first end by the housing and towards the second end by the projection.

4. A link member according to claim 3, wherein the outer sleeve is of reduced thickness in its intermediate segment.

5. A link member according to claim 1, wherein the outer sleeve has a configuration that is substantially symmetrical about the axis.

6. A link member according to claim 1, wherein the housing and/or the projection of the inner sleeve extend in annular manner about the axis.

7. A link member according to claim 1, wherein the outer sleeve also includes a through hole on a transverse axis provided in register with the housing and communicating therewith to enable the second pin to be installed.

8. A link member according to claim 7, wherein the common axis of the holes of the outer and inner sleeves for mounting the first pin, and of the first pin itself, together with the axis of the hole for mounting the second pin, are all substantially parallel with one another.

9. A link member according to claim 8, wherein the axis common to the holes of the outer and inner sleeves, for mounting the first pin, and of the first pin itself, and also the axis of the hole for mounting the second pin are substantially perpendicular to the axis of the second pin.

10. A link member according to claim 1, wherein the inner sleeve includes two holes for supporting the second pin which pin projects diametrically at both of its ends from the inner sleeve.

11. An aircraft seat including at least one link member according to claim 1.

12. An aircraft seat according to claim 10, wherein the link member is combined with a seat adjustment device, e.g. for adjusting the inclination of the seat back relative to the seat proper.

* * * * *